US011505186B2

(12) United States Patent
Ohmura (10) Patent No.: US 11,505,186 B2
(45) Date of Patent: Nov. 22, 2022

(54) VEHICLE CONTROL DEVICE (71) Applicant: Mazda Motor Corporation, Hiroshima (JP)

(72) Inventor: Hiroshi Ohmura, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 275 days.

(21) Appl. No.: 16/957,181

(22) PCT Filed: Dec. 3, 2018

(86) PCT No.: PCT/JP2018/044338
§ 371 (c)(1),
(2) Date: Jun. 23, 2020

(87) PCT Pub. No.: WO2019/130997
PCT Pub. Date: Jul. 4, 2019

(65) Prior Publication Data
US 2020/0331472 A1 Oct. 22, 2020

(30) Foreign Application Priority Data
Dec. 28, 2017 (JP) .............................. JP2017-253001

(51) Int. Cl.
*B60W 30/10* (2006.01)
*B62D 5/04* (2006.01)
(Continued)

(52) U.S. Cl.
CPC .......... *B60W 30/10* (2013.01); *B62D 5/0463* (2013.01); *B62D 6/00* (2013.01); *B60R 11/04* (2013.01);
(Continued)

(58) Field of Classification Search
CPC ............. B60W 13/10; B60W 2552/53; B60W 2520/10; B60W 2520/12; B60W 2520/20;
(Continued)

(56) References Cited

U.S. PATENT DOCUMENTS 9,643,649 B2 * 5/2017 Kashiwai ............ B60W 40/072
2009/0048738 A1 * 2/2009 Iwazaki ............... B62D 15/025
701/44
(Continued)

FOREIGN PATENT DOCUMENTS

EP 2991871 3/2016
JP 2001001922 A 1/2001
(Continued)

OTHER PUBLICATIONS

Machine Translation of Jin's reference (KR 2011-0081434 A) (Year: 2011).*
(Continued)

Primary Examiner — Russell Frejd
Assistant Examiner — Tarek Elarabi
(74) Attorney, Agent, or Firm — Alleman Hall Creasman & Tuttle LLP (57) ABSTRACT A vehicle control device includes: a target traveling path setting unit that sets a target traveling path of an own vehicle; a reference position setting unit that sets a reference position of the own vehicle for specifying a position of the own vehicle with respect to the target traveling path; and a control unit that controls a steering assist amount of a steering wheel, based on a positional deviation being a deviation between the target traveling path set by the target traveling path setting unit and the reference position of the own vehicle set by the reference position setting unit. The reference position setting unit changes the reference position according to a vehicle speed.

6 Claims, 5 Drawing Sheets (51) Int. Cl.
  *B62D 6/00* (2006.01)
  *B60R 11/04* (2006.01)
(52) U.S. Cl.
  CPC ..... *B60W 2520/10* (2013.01); *B60W 2520/12* (2013.01); *B60W 2520/20* (2013.01); *B60W 2552/53* (2020.02); *B60W 2710/20* (2013.01); *B62D 5/0421* (2013.01)
(58) Field of Classification Search
  CPC ... B60W 2710/20; B62D 6/02; B62D 5/0463; B62D 6/00; B62D 5/0421; B60R 11/04
  See application file for complete search history.

(56) References Cited

U.S. PATENT DOCUMENTS

2014/0180543 A1   6/2014   Ueda et al.
2016/0052547 A1   2/2016   Kashiwai
2019/0061808 A1*  2/2019   Mizoguchi ............ G01C 21/26

FOREIGN PATENT DOCUMENTS

| JP | 2007331581 A | 12/2007 |
| JP | 2012206606 A | 10/2012 |
| JP | 2014139063 A | 7/2014 |
| JP | 2017001625 A | 1/2017 |
| JP | 2017074838 A | 4/2017 |
| KR | 2011-0081434 A * | 7/2011 |

OTHER PUBLICATIONS

European Patent Office, Extended European Search Report Issued in Application No. 18896240.1, dated Feb. 4, 2021, Germany, 8 pages.

* cited by examiner

VEHICLE CONTROL DEVICE

TECHNICAL FIELD

The present invention relates to a vehicle control device, and more particularly to a vehicle control device for assisting steering of a steering wheel in such a way that an own vehicle travels along a target traveling path.

BACKGROUND ART

Conventionally, there is known a vehicle control device including a mechanism (steering assist mechanism) for assisting steering of a steering wheel in such a way that an own vehicle travels along a target traveling path. In a vehicle control device of this type, a target traveling path is basically set based on information to be acquired from a vehicle external monitoring device incorporated with a stereo camera, a monocular camera, or the like. For example, left and right white lines (lane markers) for defining a driving lane of an own vehicle are recognized by a vehicle external monitoring device, and a centerline of the driving lane specified based on the recognized left and right white lines, in other words, a path located at a middle between the left and right white lines is set as the target traveling path.

Patent Literature 1 discloses a vehicle motion control device including: a front imaging means that captures an area in front of an own vehicle; a state detection means that detects at least one of a yaw angle or a lateral position of the own vehicle; a time calculation means that calculates a time required for the own vehicle to reach an intersection between a line of sight of a driver and a target traveling path; a correction amount calculation means that calculates a correction amount expressed by a product of at least one of a difference between a target yaw angle and an actual yaw angle, and a difference between a target lateral position and an actual lateral position, and a predetermined coefficient; and a control means that performs correction of a steering angle, based on a deviation between the target traveling path and a center (centroid) of the own vehicle, and the correction amount calculated by the correction amount calculation means.

The vehicle motion control device of Patent Literature 1 is able to assist steering of a driver in order to acquire desirable followability with respect to a target traveling path by performing correction of a steering angle of a steering wheel, based on the deviation between the target traveling path and a vehicle centroid.

However, in the technique of Patent Literature 1, since so-called centroid-based steering assist control of assisting steering in such a way that a centroid of the own vehicle passes through a target traveling path is performed, the driver may feel a sense of incongruity.

For example, when the own vehicle is making a turn at a low speed, the driver tends to focus his/her attention to a rear portion (particularly an inner rear wheel) of the own vehicle in order to avoid an accident due to an inner wheel difference of the vehicle. Therefore, it is conceived that a reference position of the own vehicle, of which the driver is intuitively aware, in other words, a reference position of the own vehicle, which is tried to be matched with a centerline (target traveling path) of a driving lane by the driver, is present on a rear side with respect to a centroid of the own vehicle. When centroid-based steering assist control is performed during turning of the vehicle at a low speed, the driver may feel that assist control is too much.

Further, when the own vehicle is making a turn at a high speed, the driver tends to focus his/her attention to a front portion of the own vehicle in order to avoid an erroneous operation of a steering wheel. Therefore, it is conceived that a reference position of the own vehicle, of which the driver is intuitively aware, in other words, a reference position of the own vehicle, which is tried to be matched with a centerline (target traveling path) of a driving lane by the driver, is present on a front side with respect to a centroid of the own vehicle. When centroid-based steering assist control is performed during turning of the vehicle at a high speed, the driver may also feel that assist control is too much.

As described above, a reference position (hereinafter, referred to as an intuitive reference position) of an own vehicle, of which a driver is intuitively aware changes depending on a traveling speed (vehicle speed) of the own vehicle. Therefore, when centroid-based steering assist control is performed regardless of a vehicle speed, a situation in which there is a deviation between an intuitive reference position based on awareness of the driver, and a reference position (vehicle centroid) for control increases. Consequently, the driver may feel a sense of incongruity.

CITATION LIST

Patent Literature

Patent Literature 1: Japanese Unexamined Patent Application Publication No. 2012-206606

SUMMARY OF INVENTION

In view of the above circumstances, an object of the present invention is to provide a vehicle control device, which enable to reduce a sense of incongruity of a driver by performing appropriate steering assist according to a vehicle speed.

In order to achieve the above object, the present invention is directed to a vehicle control device for assisting steering of a steering wheel in such a way that an own vehicle travels along a target traveling path. The vehicle control device includes: a first detection unit that detects a vehicle speed being a traveling speed of an own vehicle; a second detection unit that detects a lane marker on a front side of the own vehicle; a target traveling path setting unit that sets a target traveling path of the own vehicle, based on the lane marker detected by the second detection unit; a reference position setting unit that sets a reference position of the own vehicle for specifying a position of the own vehicle with respect to the target traveling path; and a control unit that controls a steering assist amount of the steering wheel, based on a positional deviation being a deviation between the target traveling path set by the target traveling path setting unit and the reference position of the own vehicle set by the reference position setting unit. The reference position setting unit changes the reference position according to the vehicle speed detected by the first detection unit.

DESCRIPTION OF EMBODIMENTS

First Embodiment

A vehicle control device according to a first embodiment of the present invention is described with reference to FIGS. 1 to 4.

Figure 1:
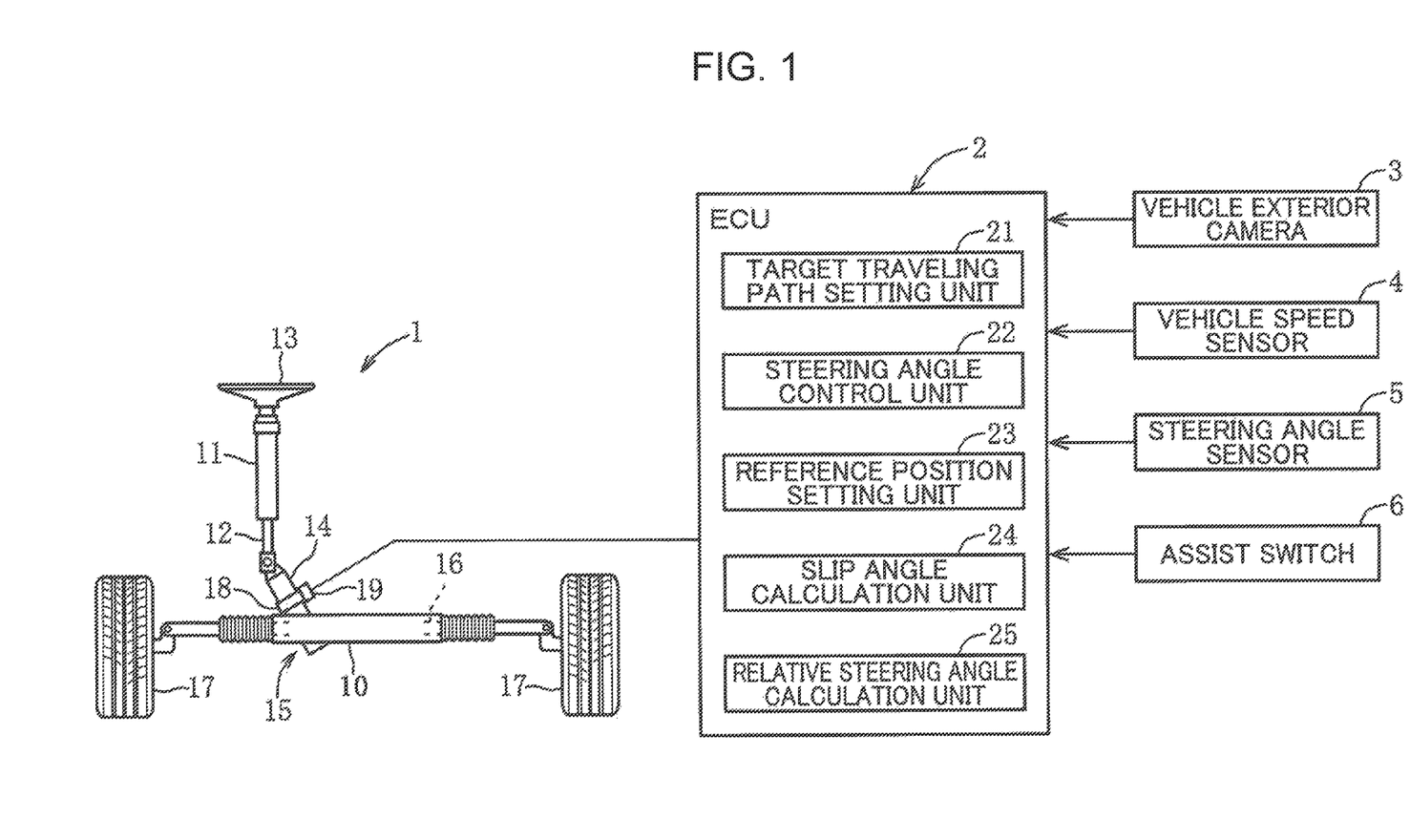
FIG. 1 is a schematic configuration diagram of a vehicle control device according to a first embodiment of the present invention.

As illustrated in FIG. 1, a vehicle control device according to the present embodiment includes a power steering mechanism 1, an electronic control unit (ECU) 2, a vehicle exterior camera 3, a vehicle speed sensor 4, a steering angle sensor 5, and an assist switch 6.

The vehicle exterior camera 3 is a camera for capturing a surrounding environment including a front side of an own vehicle, and corresponds to one example of a "second detection unit" in the present invention. The vehicle exterior camera 3 is, for example, constituted of a monocular charge coupled device (CCD) camera, and is disposed at a middle of a front end of a roof portion of the own vehicle. The vehicle speed sensor 4 is a sensor for detecting a traveling speed (hereinafter, simply referred to as a vehicle speed) of the own vehicle, and corresponds to one example of a "first detection unit" in the present invention. The steering angle sensor 5 is a sensor for detecting a steering angle of a steering wheel 13 of the own vehicle. The assist switch 6 is an on-off switch to be manually operated, and is operated to switch on/off of steering assist control.

Next, a schematic configuration of the power steering mechanism 1 is described.

The power steering mechanism 1 is configured to transmit a steering force input from a driver via the steering wheel 13 to front wheels 17, while amplifying the steering force, and change angles of the front wheels 17. The power steering mechanism 1 includes a steering column 11 supported on a vehicle body frame (not illustrated) such as an instrument panel member, a steering shaft 12 rotatably supported on the steering column 11, and a rack-and-pinion type steering gearbox 15 for converting rotational motion of the steering shaft 12 into linear motion. The steering wheel 13 is mounted on an upper end of the steering shaft 12.

The steering gearbox 15 includes a pinion shaft 14 provided at a lower end of the steering shaft 12, a rack shaft 16 engageable with the pinion shaft 14 and supported to be reciprocally movable in a left-right direction, and a rack case 10 for accommodating the rack shaft 16. The steering gearbox 15 is disposed within an engine room of a vehicle body front portion.

The rack shaft 16 is disposed in such a way that left and right ends thereof protrude from an end of the rack case 10. A front knuckle (not illustrated) is connected to each of the left and right ends of the rack shaft 16 via a tie rod.

The front knuckles rotatably support the paired left and right front wheels 17 as wheels for steering, and are steerably supported on a vehicle body frame. When the steering wheel 13 is steered, the steering shaft 12 and the pinion shaft 14 are rotated, the rack shaft 16 is moved in the left-right direction according to rotation of the pinion shaft 14, and angles of the paired front wheels 17 are changed (steered).

The power steering mechanism 1 is an electrically operated mechanism for electrically assisting steering of the steering wheel 13 by the driver. Specifically, the power steering mechanism 1 includes an electric motor 19 and an assist transmission mechanism 18. The assist transmission mechanism 18 is interposed between the electric motor 19 and the pinion shaft 14, and transmits an output torque of the electric motor 19 to the pinion shaft 14.

The electric motor 19 assists steering of the steering wheel 13 by applying a predetermined additional torque to a steering torque input from the driver via the steering wheel 13. The additional torque includes an assist torque to be applied according to a steering torque input via the steering wheel 13, and a steering angle correction torque for correcting a steering angle (increasing or decreasing a steering angle according to a relative steering angle $\theta h$ to be described later). The electric motor 19 is controlled in such a way that drive current of the electric motor 19 coincides with target current output from the ECU 2 as a control command value.

Next, the ECU 2 is described.

The ECU 2 has a function of assisting steering of the steering wheel 13 through the power steering mechanism 1 (electric motor 19) in such a way that the own vehicle travels along a target traveling path.

The ECU 2 includes a central processing unit (CPU), an ROM, an RAM, an inner interface, and an outer interface. Various programs and various pieces of data for control are stored in the ROM, and data for use when the CPU executes a series of processing are temporarily stored in the RAM.

A more specific function of the ECU 2 is described. As illustrated in FIG. 1, the ECU 2 functionally includes a target traveling path setting unit 21 which sets a target traveling path of an own vehicle on a driving lane, a steering angle control unit 22 (control unit) which performs various control relating to steering of the steering wheel 13, a reference position setting unit 23 which sets a reference position P (see FIGS. 2A and 2B) of the own vehicle for control, a slip angle calculation unit 24 which calculates a slip angle representing a traveling direction of the own vehicle, and a relative steering angle calculation unit 25 which calculates a relative steering angle $\theta h$ (steering angle correction amount) of the steering wheel 13.

The target traveling path setting unit 21 specifies positions of left and right white lines (lane markers) for defining widthwise outer ends of a driving lane of the own vehicle by performing image processing with respect to a captured image on a front side of the own vehicle, which is captured by the vehicle exterior camera 3. Further, the target traveling path setting unit 21 defines a centerline of the driving lane, which is located at a middle between the specified left and right white lines and continues in a traveling direction of the own vehicle, and sets the centerline as a target traveling path L (see FIGS. 2A and 2B) of the own vehicle.

The steering angle control unit 22 controls a steering assist amount, based on a deviation between the target traveling path L set by the target traveling path setting unit 21, and the reference position P of the own vehicle to be described later.

The reference position setting unit 23, the slip angle calculation unit 24, and the relative steering angle calculation unit 25 calculate various pieces of information necessary for steering assist control to be performed by the steering angle control unit 22. Details of these units are as follows.

First, the reference position setting unit 23 is described.

The reference position setting unit 23 sets the reference position P of the own vehicle for control, in other words, the reference position P (see FIGS. 2A and 2B) of the own vehicle for specifying a displacement between the target traveling path L and an actual traveling path of the own vehicle. The reference position P is not fixed to a structural centroid position Pa of the own vehicle, and is shifted to a front side or a rear side with respect to the centroid position Pa according to a vehicle speed. This is for the purpose of allowing the reference position P of the own vehicle to match with (or come close to) an intuitive reference position being a reference position of the own vehicle, of which the driver is intuitively aware.

When the own vehicle is traveling at an intermediate speed (e.g., 40 km/h), the above-described intuitive reference position, in other words, a reference position of the own vehicle, which is tried to be matched with the centerline (target traveling path) of the driving lane by the driver, coincides the centroid position Pa of the own vehicle. The centroid position Pa can be regarded to be present substantially at a middle of a vehicle body center axis extending in a front-rear direction. The centroid position Pa is stored in advance in a storage unit of the ECU 2.

Figures 2A, 2B:
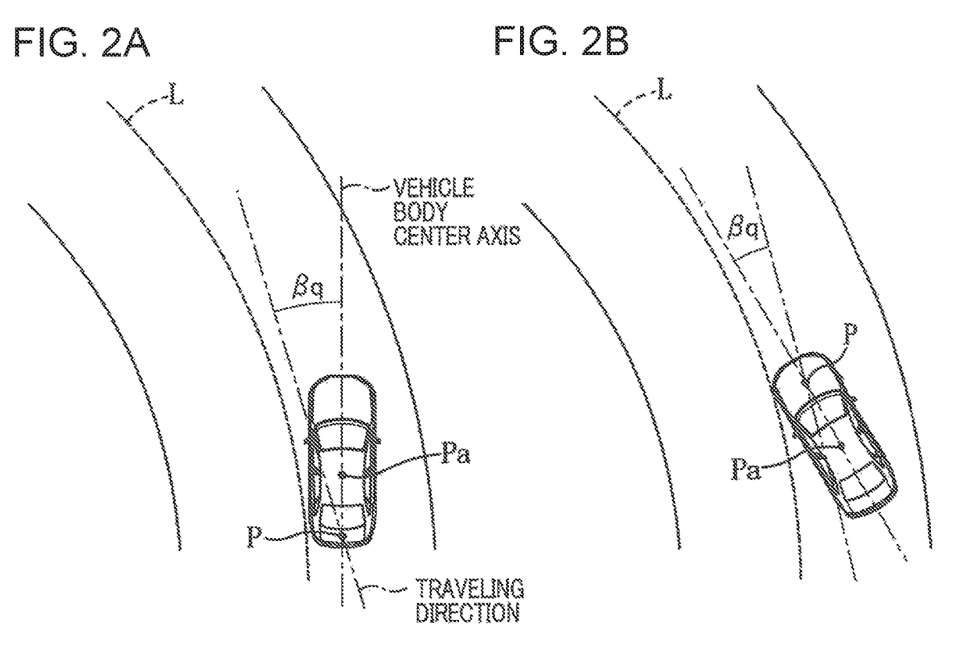
FIGS. 2A and 2B are explanatory diagrams each illustrating an intuitive reference position during turning of a vehicle at a low speed or during turning of the vehicle at a high speed.

On the other hand, as illustrated in FIG. 2A, when the own vehicle is making a turn at a low speed (e.g. 20 km/h), the driver focuses his/her attention to a rear portion of the own vehicle, and tries to match the rear portion of the own vehicle with the centerline of the driving lane. In other words, during turning at a low speed, the intuitive reference position is shifted to a rear side with respect to the centroid position Pa. In this case, a rearward displacement amount of the intuitive reference position with respect to the centroid position Pa tends to increase, as a vehicle speed decreases (in inverse proportion to a vehicle speed).

Conversely, as illustrated in FIG. 2B, when the own vehicle is making a turn at a high speed (e.g. 60 km/h), the driver focuses his/her attention to a front side of the vehicle, and tries to match a front portion of the own vehicle with the centerline of the driving lane. In other words, during turning at a high speed, the intuitive reference position is shifted to a front side with respect to the centroid position Pa. In this case, a forward displacement amount of the intuitive reference position with respect to the centroid position Pa tends to increase, as a vehicle speed increases (in proportion to a vehicle speed).

In order to follow a change in intuitive reference position as described above, the reference position setting unit 23 variably sets the reference position P according to a vehicle speed during traveling of the own vehicle.

Figure 3:
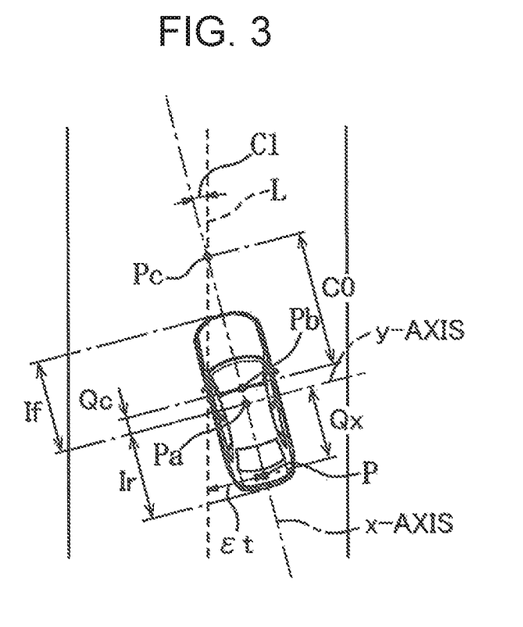
FIG. 3 is an explanatory diagram illustrating various physical amounts relating to an own vehicle on two-dimensional coordinates.

FIG. 3 is a diagram illustrating a position of the own vehicle on a driving lane in a two-dimensional orthogonal coordinate system in which the centroid position Pa is set as an origin. In FIG. 3, it is assumed that an axis (in other words, a vehicle body center axis) passing through the centroid position Pa and extending in the vehicle front-rear direction is an x-axis, and an axis passing through the centroid position Pa and orthogonal to the x-axis is a y-axis. On the x-axis, a front side with respect to the centroid position Pa is a plus side. In this case, when it is assumed that a distance in the x-axis direction from the centroid position Pa to the reference position P is Qx, the distance Qx can be calculated according to the following formula (1). In other words, the reference position setting unit 23 specifies a position of the reference position P of the own vehicle as (Qx, 0) on two-dimensional coordinates using the xy-axis by using Qx to be calculated from the following formula (1). FIG. 3 illustrates the reference position P when Qx has a minus value.

[Formula 1]

$$Qx = Ir \times \tanh\frac{(V-15)}{kw} \quad (1)$$

where Ir denotes a distance from the centroid position Pa to a vehicle body rear end, kw denotes a constant (e.g. 15), and V denotes a vehicle speed (m/sec) based on a detection value of the vehicle speed sensor 4.

Thus, the reference position P of the own vehicle is set on a vehicle body rear side, as a vehicle speed decreases. In other words, the reference position P is shifted to a vehicle body front side, as a vehicle speed increases. For example, when a vehicle speed is zero, the reference position P is set to a position away from the centroid position Pa (origin) by −Ir in the x-axis direction, in other words, set to a vehicle body rear end. When a vehicle speed is 15 m/sec, the reference position P is set to the centroid position Pa. When a vehicle speed is 30 m/sec, the reference position P is set to a position away from the centroid position Pa by +Ir in the x-axis direction. In a case where the centroid position Pa is substantially at a middle of the vehicle body center axis, the reference position P (position away from the centroid position Pa by +Ir in the x-axis direction) when a vehicle speed is 30 m/sec substantially coincides with a vehicle body front end.

As illustrated in FIG. 3, it is assumed that a displacement amount (deviation) in the y-axis direction between the reference position P of the own vehicle specified by using the formula (1), and the target traveling path L is a positional deviation εt. The positional deviation εt can be calculated according to the following formula (2) by using a distance Qc between a setting position Pb of the vehicle exterior camera 3 and the centroid position Pa, a distance C0 from an intersection Pc between the target traveling path L and the x-axis to the setting position Pb of the vehicle exterior camera 3, and an intersection angle C1 between the target traveling distance L and the x-axis.

[Formula 2]

$$\varepsilon t = (C0 + Qx + Qc) \times \sin(C1) \quad (2)$$

Positional correction of the own vehicle by steering assist control is performed in such a way that the positional deviation εt is reduced toward zero.

Next, the slip angle calculation unit 24 is described.

The slip angle calculation unit 24 calculates a first slip angle βq representing a current traveling direction of the own vehicle, and a second slip angle βτ representing a target traveling direction of the own vehicle after lapse of a predetermined minute time (e.g. 100 msec) from a current time. The first slip angle βq is an angle defined by a direction along which the reference position P of the own vehicle is currently traveling, and the vehicle body center axis (x-axis). The second slip angle βτ is an angle defined by a target traveling direction along which the reference position P of the own vehicle is supposed to be traveling after lapse of a predetermined time, and the vehicle body center axis (x-axis). During turning of the vehicle, the slip angle increases, as a turning radius decreases. Therefore, it is possible to use the slip angle as a physical amount representing a traveling direction of the vehicle.

When it is assumed that a slip angle with respect to the centroid position Pa is β, a distance in the x-axis direction from the centroid position Pa to a vehicle body front end is lf, a distance in the x-axis direction from the centroid position Pa to a vehicle body rear end is lr, and a yaw rate is φ with a dot sign, it is possible to calculate a slip angle βf in a high speed state in which the reference position P is present on the vehicle body front end, and a slip angle βr in a low speed state in which the reference position P is present on the vehicle body rear end according to the following formula (3).

[Formula 3]

$$\beta f = \beta + \frac{lf + \dot{\varphi}}{V}$$

$$\beta r = \beta - \frac{lr \times \dot{\varphi}}{V}$$

(3)

On the other hand, a distance in the x-axis direction from the centroid position Pa to the reference position P is Qx, which is defined by the formula (1). Thus, it is possible to calculate the first slip angle βq representing a current traveling direction of the reference position P according to the following formula (4).

[Formula 4]

$$\beta q = \beta + \frac{Qx + \dot{\varphi}}{V}$$

(4)

Since Qx may have a plus sign or a minus sign depending on a value of the vehicle speed V, the first slip angle βq calculated by the formula (4) may be larger or smaller than the slip angle β at the centroid position Pa.

Further, it is possible to calculate the second slip angle βτ representing a target traveling direction after lapse of a predetermined time (e.g. 100 msec) from a current time, in other words, the second slip angle βτ representing a direction along which the reference position P is supposed to be traveling when the own vehicle reaches a target position after lapse of a predetermined time according to the following formula (5) by using coordinates $(x_0, y_0)$ of a current reference position P, and predicted coordinates $(x_2, y_2)$ of the reference position P after lapse of the predetermined time.

[Formula 5]

$$\beta \tau = \tan^{-1}\left(\frac{y_2 - y_0}{x_2 - x_0}\right)$$

(5)

It is assumed that a deviation amount of a traveling direction (angle) of the reference position P of the own vehicle, of which the driver is intuitively aware, is an angular deviation εβ. The angular deviation εβ can be calculated according to the following formula (6) by using the first slip angle βq and the second slip angle βτ.

[Formula 6]

$$\varepsilon \beta = \beta \tau - \beta q$$

$$= \tan^{-1}\left(\frac{y_2 - y_0}{x_2 - x_0}\right) - \left(\beta + \frac{Qx \times \dot{\varphi}}{V}\right)$$

(6)

Positional correction of the own vehicle by steering assist control is performed in such a way that the angular deviation εβ is reduced toward zero.

Next, the relative steering angle calculation unit 25 is described.

The relative steering angle calculation unit 25 sets a target steering angle, based on the positional deviation ετ and the angular deviation εβ. Specifically, the relative steering angle calculation unit 25 calculates a relative steering angle θh corresponding to a steering angle amount by which the steering angle is increased or decreased with respect to a current steering angle according to the following formula (7) by using the positional deviation ετ derived by the formula (2), and the angular deviation εβ derived by the formula (6).

[Formula 7]

$$\theta h = h1 \times \varepsilon \tau \times kp + h2 \times \varepsilon \beta \times k\beta p$$

(7)

where kp denotes a positional deviation control gain, kβp denotes an angular deviation control gain, and h1 and h2 denote weighting coefficients.

In the present embodiment, kp and kβp are variables in inverse proportion to the vehicle speed V (m/sec), which are expressed by the following formula (8). Further, both of h1 and h2 are equally set to 0.5.

[Formula 8]

$$kp = -0.8/V$$

$$k\beta p = -0.2/V$$

(8)

The ECU 2 outputs a control command signal associated with the relative steering angle θh derived by the formula (7), and drives the electric motor 19.

Next, a specific procedure of steering assist control is described with reference to a flowchart of FIG. 4.

Figure 4:
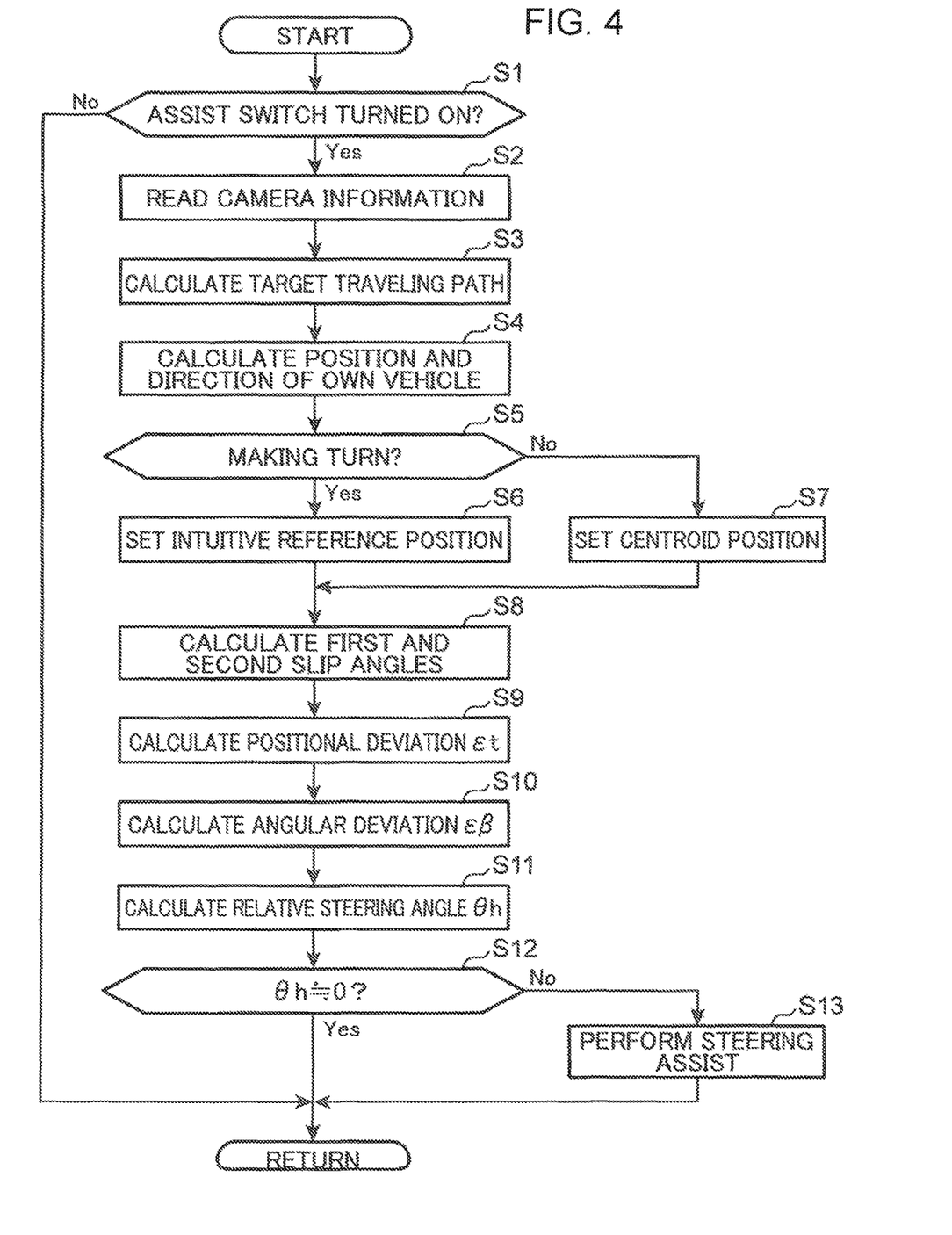
FIG. 4 is a flowchart illustrating a specific procedure of steering assist control.

It is assumed that a processing cycle in steering assist control illustrated in FIG. 4 is 100 msec. Therefore, it is possible to set a predetermined time for use in calculating the second slip angle βτ in Step S8 to be described later, to 100 msec as well as the processing cycle.

First, in Step S1, the ECU 2 determines whether the assist switch 6 is turned on.

When it is determined that a determination result in Step S1 is YES and it is confirmed that the assist switch 6 is turned on, in other words, when the driver requests steering assist, the flow proceeds to Step S2. On the other hand, it is determined that a determination result in Step S1 is NO and it is confirmed that the assist switch 6 is not turned on, in other words, when there is no request for steering assist by the driver, the flow is returned.

In Step S2, the ECU 2 reads image information captured by the vehicle exterior camera 3. Further, in next Step S3, the ECU 2 specifies a centerline of the driving lane, based on the image information read in Step S2, and sets the centerline as the target traveling path L.

Subsequently, in Step S4, the ECU 2 calculates a position of the own vehicle on the driving lane, and a direction of the vehicle body center axis of the own vehicle. For example, the ECU 2 calculates, as a position of the own vehicle, a relative position of the current centroid position Pa with respect to the target traveling path L. Further, the ECU 2 calculates, as a direction of the vehicle body center axis, an angle (C1 in FIG. 3) defined by the current vehicle body center axis (x-axis) with respect to the target traveling path L.

Subsequently, in Step S5, the ECU 2 determines whether the own vehicle is making a turn. In the present embodiment, it is determined that the vehicle is making a turn, when a turning radius is smaller than a predetermined threshold value.

When it is determined that a determination result in Step S5 is YES and it is confirmed that the own vehicle is making a turn (the turning radius is smaller than the threshold value), in Step S6, the ECU 2 calculates the distance Qx by using the formula (1), and sets, as the reference position P for steering assist control, a coordinate position (Qx, 0), which is away from the centroid position Pa of the own vehicle by the distance Qx in the x-axis direction.

On the other hand, when it is determined that a determination result in Step S5 is NO and it is confirmed that the own vehicle is not making a turn (the turning radius is equal to or larger than the threshold value), in Step S7, the ECU 2 sets the centroid position Pa of the own vehicle stored in advance, as the reference position P for steering assist control. In the present embodiment, since it is determined whether the vehicle is making a turn, based on comparison of a turning radius with a threshold value, it is determined that the vehicle is not making a turn, even when the vehicle is making a gradual turn in which the turning radius is equal to or larger than the threshold value, and a reference for steering assist control is set to the centroid position Pa. This is because it is less likely that the driver feels a sense of incongruity, even when the centroid position Pa is set as a reference, as far as the vehicle is making a gradual turn.

After setting the reference position P of the own vehicle in Step S6 or S7, in Step S8, the ECU 2 calculates the first slip angle βq being an angle defined by a current traveling direction of the reference position P and the vehicle body center axis (x-axis), and calculates the second slip angle βτ being an angle defined by a traveling direction (target traveling direction) of the reference position P which is estimated after lapse of a predetermined time (100 msec) and the vehicle body center axis (x-axis).

Subsequently, in Step S9, the ECU 2 calculates the positional deviation εt being a deviation in the y-axis direction between the reference position P and the target traveling path L by using the formula (2).

Subsequently, in Step S10, the ECU 2 calculates the angular deviation εβ being a deviation between the first slip angle βq and the second slip angle βτ by using the formula (6).

Subsequently, in Step S11, the ECU 2 calculates the relative steering angle θh from the positional deviation εt and the angular deviation εβ calculated in Steps S9 and S10 by using the formula (7).

Subsequently, in Step S12, the ECU 2 determines whether the relative steering angle θh calculated in Step S11 is substantially zero.

When it is determined that a determination result in Step S12 is NO and it is confirmed that the relative steering angle θh is not substantially zero, in other words, when it is necessary to correct the steering angle by increasing or decreasing a current steering angle, in Step S13, the ECU 2 performs steering assist of driving the electric motor 19 to generate a steering angle correction torque according to the relative steering angle θh.

On the other hand, when it is determined that a determination result in Step S12 is YES and it is confirmed that the relative steering angle θh is substantially zero, in other words, when it is not necessary to correct the steering angle with respect to a current steering angle, the flow is returned.

Next, advantageous effects and operations of the vehicle control device according to the first embodiment as described above are described.

In the first embodiment, the target traveling path L of the own vehicle is set based on a captured image by the vehicle exterior camera 3, and a steering assist amount of the steering wheel 13 is controlled based on the positional deviation εt being a deviation between the target traveling path L and the reference position P of the own vehicle. Therefore, it is possible to appropriately assist steering of the driver in such a way that the own vehicle travels along the target traveling path L (the reference position P approaches the target traveling path L).

Further, the reference position P, based on which the own vehicle is controlled in performing steering assist as described above, is changed according to a vehicle speed detected by the vehicle speed sensor 4. Therefore, it is possible to suppress generation of a displacement between the reference position (intuitive reference position) of the own vehicle, of which the driver is intuitively aware, and the reference position P for control. Thus, it is possible to reduce a sense of incongruity the driver may feel with respect to steering assist.

In particular, in the first embodiment, since the reference position P is shifted to a vehicle body rear side, as a vehicle speed decreases, it is possible to linearly change the reference position P for control in conformity with a tendency that the intuitive reference position is displaced to the vehicle body rear side, as a vehicle speed decreases. Thus, it is possible to sufficiently suppress generation of a displacement between the reference position P for control and the intuitive reference position. Therefore, it is possible to advantageously reduce a sense of incongruity of the driver.

Further, in the first embodiment, it is determined that the own vehicle is making a turn, when a turning radius is smaller than a threshold value, and the above-described processing of changing the reference position P according to a vehicle speed is performed only when the above-described determination is made. Therefore, it is possible to perform steering assist, based on an appropriate position that is coincident with (or close to) the intuitive reference position during turning in which the traveling path of the own vehicle is likely to be deviated from the target traveling path L, and it is possible to enhance turning performance, while reducing a sense of incongruity of the driver. Further, it is not necessary to change the reference position P according to a vehicle speed when a turning radius is equal to or larger than the threshold value. Therefore, it is possible to reduce processing load by simplifying a control content.

Furthermore, in the first embodiment, in addition to the positional deviation εt, the angular deviation εβ being a deviation between the first slip angle βq representing a current traveling direction of the own vehicle, and a second slip angle βτ representing a traveling direction of the own vehicle after lapse of a predetermined time is calculated; and a steering assist amount of the steering wheel 13 is controlled based on both of the positional deviation εt and the angular deviation εβ. Therefore, it is possible to more appropriately assist steering of the driver in such a way that the own vehicle travels along the target traveling path L.

Second Embodiment

Next, a vehicle control device according to a second embodiment of the present invention is described.

In the first embodiment, the reference position P is variably set in such a way that the reference position P for steering assist control coincides with a reference position (intuitive reference position), of which the driver is intuitively aware. In the second embodiment, a reference position for steering assist control is fixed to a centroid position Pa.

As illustrated in FIGS. 2A and 2B, however, since the intuitive reference position during turning at a low speed (or during turning at a high speed) is shifted to a rear side (or to a front side) with respect to the centroid position Pa, a sense of incongruity of the driver may not be reduced by merely fixing the reference position P to the centroid position Pa.

In view of the above, the present embodiment adopts measures such that, in addition to fixing the reference position P for steering assist control to the centroid position Pa regardless of a vehicle speed, a positional deviation control gain kp (in other words, a gain to be multiplied by the positional deviation εt) expressed by the formula (7) is reduced during turning at a low speed or during turning at a high speed. The positional deviation control gain kp corresponds to a "control gain" in the present invention.

Figure 5:
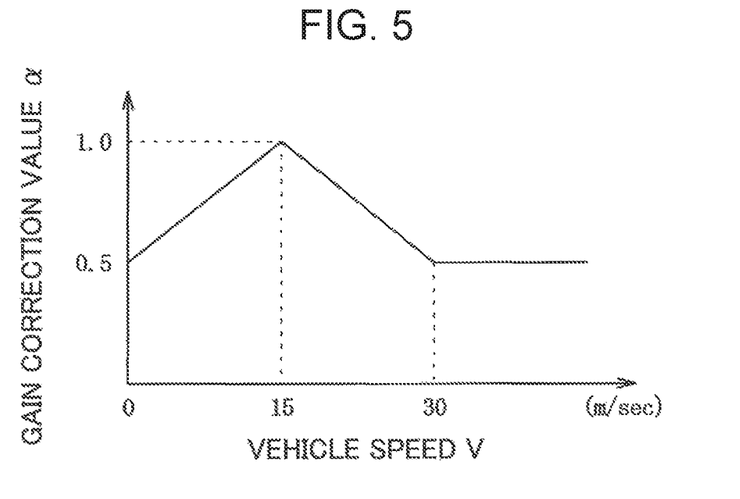
FIG. 5 is a diagram illustrating a gain correction value map for use in a second embodiment of the present invention.

FIG. 5 illustrates a map for determining a gain correction value α being a correction coefficient for reducing the positional deviation control gain kp. In the map, a vertical axis denotes the gain correction value α, and a horizontal axis denotes a vehicle speed V (m/sec).

The gain correction value α is set to a minimum value 0.5 when a vehicle speed is zero, increases linear-functionally according to a vehicle speed in a vehicle speed range from zero to 15 m/sec, and is set to a maximum value 1 when a vehicle speed is 15 m/sec. Further, the gain correction value α decreases linear-functionally according to a vehicle speed in a vehicle speed range from 15 m/sec to 30 m/sec, and is kept to a minimum value 0.5 in a vehicle speed range of 30 m/sec or larger. In other words, the gain correction value α is set to increase according to a vehicle speed in a relatively low first vehicle speed range (0 to 15 m/sec), and decrease according to a vehicle speed in a relatively high second vehicle speed range (15 to 30 m/sec).

The positional deviation control gain kp is calculated according to the following formula (9) by using the gain correction value α determined by the map and the vehicle speed V.

[Formula 9]

$$kp=(-0.8\times\alpha)/V \quad (9)$$

As expressed by the formula (9), in the present embodiment, as the positional deviation control gain kp, a value in inverse proportion to the vehicle speed V and corrected by the gain correction value α is used.

As described above, in the second embodiment, the reference position P for steering assist control is fixed to the centroid position Pa regardless of a vehicle speed. Therefore, it is not necessary to change the reference position P according to a vehicle speed, and it is possible to reduce processing load by simplifying a control content. Furthermore, the gain correction value α which reduces the positional deviation control gain kp to be multiplied by the positional deviation εt, as compared with the first embodiment, is used, and the gain correction value α is set to increase or decrease according to a vehicle speed. Therefore, it is possible to acquire advantageous effects similarly to a case that the reference position P is changed to approach the intuitive reference position. Thus, it is possible to reduce a sense of incongruity of the driver with a simplified configuration.

Next, modification examples in which the embodiment (first embodiment or second embodiment) is partially modified are described.

(1) The first embodiment describes an example in which the reference position P for steering assist control is linearly changed according to a vehicle speed in a range from a vehicle body front end to a vehicle body rear end. Alternatively, to speed up processing, a plurality of reference positions associated with a plurality of vehicle speed ranges separated by a plurality of threshold values may be stored in advance, and the plurality of reference positions may be selectively used according to a vehicle speed. For example, when three reference positions are selectively used, it is possible to store in advance a rear-side reference position for use in a low vehicle speed range of smaller than 10 m/sec, a standard reference position (centroid position) for use in an intermediate vehicle speed range from 10 to 20 m/sec, and a front-side reference position for use in a high vehicle speed range of not smaller than 20 m/sec. Then, these three reference positions may be selectively used according to a determination as to in which one of the low vehicle speed range, the intermediate vehicle speed range, and the high vehicle speed range, a current vehicle speed lies.

Further, in the modification example, the rear-side reference position is not limited to a vehicle body rear end, and may be a position corresponding to a rear wheel axle. Likewise, the front-side reference position is not limited to a vehicle body front end, and may be a position corresponding to a front wheel axle.

In any case, in the present invention, it is possible to modify a reference position setting method in various ways, as far as a relationship such that a first reference position is located on a vehicle body rear side with respect to a second reference position is satisfied, when a reference position (first reference position) set when a vehicle speed is a first speed is compared with a reference position (second reference position) set when a vehicle speed is a second speed higher than the first speed.

(2) In the second embodiment, the gain correction value α is linearly changed in a predetermined vehicle speed range (0 to 30 m/sec). Alternatively, to speed up processing, a plurality of gain correction values associated with a plurality of vehicle speed ranges separated by a plurality of threshold values may be stored in advance, and the plurality of gain correction values may be selectively used according to a vehicle speed. For example, when two gain correction values are selectively used, a first gain correction value (e.g. 0.5) for use in a vehicle speed range of smaller than 10 m/sec or in a vehicle speed range of not smaller than 20 m/sec, and a second gain correction value (e.g. 1) for use in a vehicle speed range of not smaller than 10 m/sec but smaller than 20 m/sec may be stored in advance, and the first and second gain correction values may be selectively used according to a determination as to in which one of the vehicle speed ranges, a current vehicle speed lies.

(3) The embodiments describe steering assist control performed when the vehicle is making a turn. However, steering assist control can be applied to at least a case where a reference position of the vehicle is deviated from a target traveling path, and steering assist control may be applied to linear traveling.

(4) In addition to the above, a person skilled in the art may carry out the present invention by adding various modifications to the embodiments without deviating from the gist of the present invention. The present invention also includes such modifications.

Overview of Embodiments

The following is an overview of the embodiments.

A vehicle control device according to the embodiments assists steering of a steering wheel in such a way that an own vehicle travels along a target traveling path. The vehicle control device includes: a first detection unit that detects a vehicle speed being a traveling speed of an own vehicle; a second detection unit that detects a lane marker on a front side of the own vehicle; a target traveling path setting unit that sets a target traveling path of the own vehicle, based on the lane marker detected by the second detection unit; a reference position setting unit that sets a reference position of the own vehicle for specifying a position of the own vehicle with respect to the target traveling path; and a control unit that controls a steering assist amount of the steering wheel, based on a positional deviation being a deviation between the target traveling path set by the target traveling path setting unit and the reference position of the own vehicle set by the reference position setting unit. The reference position setting unit changes the reference position according to the vehicle speed detected by the first detection unit.

In the vehicle control device, the target traveling path of the own vehicle is set based on the lane marker detected on the front side of the own vehicle, and the steering assist amount of the steering wheel is controlled based on the positional deviation being a deviation between the target traveling path and the reference position of the own vehicle. Therefore, it is possible to appropriately assist steering of the driver in such a way that the own vehicle travels along the target traveling path (the reference position approaches the target traveling path).

Further, since the reference position, based on which the own vehicle is controlled in performing steering assist as described above, is changed according to the vehicle speed, it is possible to suppress generation of a displacement between the reference position (intuitive reference position) of the own vehicle, of which the driver is intuitively aware, and the reference position for control. Thus, it is possible to reduce a sense of incongruity the driver may feel with respect to steering assist.

Preferably, when it is assumed that a reference position to be set when the vehicle speed is a first speed is a first reference position, and a reference position to be set when the vehicle speed is a second speed higher than the first speed is a second reference position, the reference position setting unit may change the reference position according to the vehicle speed in such a way that the first reference position is located on a vehicle body rear side with respect to the second reference position.

It is clear that the intuitive reference position being a reference position of the own vehicle, of which the driver is intuitively aware, is displaced to the vehicle body rear side, as the vehicle speed decreases. In view of the above, in the above configuration, the reference position (first reference position) when the vehicle speed is low is set on the vehicle body rear side with respect to the reference position (second reference position) when the vehicle speed is high. Therefore, it is possible to set an appropriate reference position in conformity with the above tendency. Thus, it is possible to advantageously reduce a sense of incongruity of the driver.

In the above configuration, more preferably, the reference position setting unit may change the reference position to the vehicle body rear side, as the vehicle speed decreases in a vehicle speed range including the first speed and the second speed.

In the above configuration, it is possible to linearly change the reference position in conformity with the above tendency that the intuitive reference position is displaced to the vehicle body rear side, as the vehicle speed decreases. Therefore, it is possible to more advantageously reduce a sense of incongruity of the driver.

Preferably, the reference position setting unit may change the reference position according to the vehicle speed when the own vehicle makes a turn.

In the above configuration, it is possible to perform steering assist by using as a reference an appropriate position that is coincident with (or close to) the intuitive reference position, during turning in which a traveling path of the own vehicle is likely to be deviated from the target traveling path. Thus, it is possible to enhance turning performance, while reducing a sense of incongruity of the driver.

In the above configuration, more preferably, the reference position setting unit may change the reference position according to the vehicle speed when a turning radius is smaller than a predetermined value.

In the above configuration, it is not necessary to change the reference position according to the vehicle speed when the turning radius is equal to or larger than the predetermined value. Therefore, it is possible to reduce processing load by simplifying a control content.

Preferably, the vehicle control device may further include a slip angle calculation unit that calculates, during turning of the own vehicle, a first slip angle representing a current traveling direction of the own vehicle, and a second slip angle representing a target traveling direction of the own vehicle after lapse of a predetermined time. The control unit may control a steering assist amount of the steering wheel, based on an angular deviation being a deviation between the first slip angle and the second slip angle calculated by the slip angle calculation unit, and the positional deviation being a deviation between the target traveling path and the reference position.

In this way, when the steering assist amount of the steering wheel is controlled based on both of the positional deviation and the angular deviation, it is possible to more appropriately assist steering of the driver in such a way that the own vehicle travels along the target traveling path.

A vehicle control device according to another aspect of the embodiments assists steering of a steering wheel in such a way that an own vehicle travels along a target traveling path. The vehicle control device includes: a first detection unit that detects a vehicle speed being a traveling speed of an own vehicle; a second detection unit that detects a lane marker on a front side of the own vehicle; a target traveling path setting unit that sets the target traveling path of the own vehicle, based on the lane marker detected by the second detection unit; and a control unit that controls a steering assist amount of the steering wheel, based on a positional deviation being a deviation between the target traveling path set by the target traveling path setting unit and a centroid position of the own vehicle, and a control gain to be multiplied by the positional deviation. The control unit sets, as the control gain, a value in inverse proportion to the vehicle speed detected by the first detection unit, and corrected by a predetermined correction coefficient. The correction coefficient is set to increase according to the vehicle speed when the vehicle speed lies in a first vehicle speed range, and decrease according to the vehicle speed when the vehicle speed lies in a second vehicle speed range higher than the first vehicle speed range.

In the above configuration, it is possible to reduce a sense of incongruity the driver may feel with respect to steering assist with a simplified configuration.

The invention claimed is:

1. A vehicle control device for assisting steering of a steering wheel in such a way that an own vehicle travels along a target traveling path, comprising:
   a vehicle speed sensor that detects a vehicle speed being a traveling speed of an own vehicle;
   a camera that detects a lane marker on a front side of the own vehicle;
   a target traveling path setting unit that sets a target traveling path of the own vehicle, based on the lane marker detected by the camera; and
   an electronic control unit that functionally includes:
      a reference position setting unit that sets a reference position of the own vehicle for specifying a position of the own vehicle with respect to the target traveling path; and
      a steering angle control unit that controls a steering assist amount of the steering wheel, based on a positional deviation being a deviation between the target traveling path set by the target traveling path setting unit and the reference position of the own vehicle set by the reference position setting unit, wherein
   the reference position setting unit changes the reference position according to the vehicle speed detected by the vehicle speed sensor, and
   when a reference position to be set when the vehicle speed is a first speed is a first reference position, and a reference position to be set when the vehicle speed is a second speed higher than the first speed is a second reference position, the reference position setting unit changes the reference position according to the vehicle speed in such a way that the first reference position is located on a vehicle body rear side with respect to the second reference position.

2. The vehicle control device according to claim 1, wherein
   the reference position setting unit changes the reference position to the vehicle body rear side, as the vehicle speed decreases in a vehicle speed range including the first speed and the second speed.

3. The vehicle control device according to claim 2, wherein
   the reference position setting unit changes the reference position according to the vehicle speed when the own vehicle makes a turn.

4. The vehicle control device according to claim 1, wherein
   the reference position setting unit changes the reference position according to the vehicle speed when the own vehicle makes a turn.

5. The vehicle control device according to claim 4, wherein
   the reference position setting unit changes the reference position according to the vehicle speed when a turning radius is smaller than a predetermined value.

6. The vehicle control device according to claim 1, wherein
   the electronic control unit further functionally includes a slip angle calculation unit that calculates, during turning of the own vehicle, a first slip angle representing a current traveling direction of the own vehicle, and a second slip angle representing a target traveling direction of the own vehicle after lapse of a predetermined time, and
   the steering angle control unit controls a steering assist amount of the steering wheel, based on an angular deviation being a deviation between the first slip angle and the second slip angle calculated by the slip angle calculation unit, and the positional deviation being a deviation between the target traveling path and the reference position.

* * * * *